(12) United States Patent
Kim et al.

(10) Patent No.: US 6,912,120 B2
(45) Date of Patent: Jun. 28, 2005

(54) TILTING AND SHIELDING APPARATUS OF MONITOR

(75) Inventors: Tae-sung Kim, Yongin (KR); Ki-hyub Sung, Suwon (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 10/316,079

(22) Filed: Dec. 11, 2002

(65) Prior Publication Data

US 2003/0227739 A1 Dec. 11, 2003

(30) Foreign Application Priority Data

Jun. 7, 2002 (KR) ........................................ 2002-31959

(51) Int. Cl.⁷ ................................................ G06F 1/16
(52) U.S. Cl. ........................ 361/681; 248/919; 248/922
(58) Field of Search ................................. 361/679, 681, 361/683, 686; 248/917, 918, 919, 920, 921, 922, 923, 371, 398

(56) References Cited

U.S. PATENT DOCUMENTS 6,216,989 B1 * 4/2001 Shioya et al. ............ 248/122.1
6,268,997 B1 * 7/2001 Hong ........................ 361/681
6,330,993 B1 * 12/2001 Cho ........................... 248/371
6,347,433 B1 * 2/2002 Novin et al. ................. 16/367
6,601,810 B2 * 8/2003 Lee ........................... 248/278.1

FOREIGN PATENT DOCUMENTS

| JP | Hey 11-155706 | 6/1999 |
|----|---------------|--------|
| KR | 91-17227 | 10/1991 |
| KR | P 1997-28190 | 6/1997 |

* cited by examiner

Primary Examiner—Dean A. Reichard
Assistant Examiner—Carmelo Oliva
(74) Attorney, Agent, or Firm—Staas & Halsey LLP (57) ABSTRACT

A monitor includes a monitor main body, a base member supporting the monitor main body, a monitor hinge supporting the monitor main body to be tilted against the base member within a predetermined angle, and a shield rotatably combined to the monitor main body to shield a gap between the monitor main body and the base member rotating downwardly when the monitor main body is tilted up. With this configuration, a tilting angle range of the monitor main body can be easily widened. Further, the shield can shield the gap shown between a base member and a monitor main body due to the tilt of the monitor main body.

25 Claims, 8 Drawing Sheets

TILTING AND SHIELDING APPARATUS OF MONITOR

CROSS-REFERENCE TO RELATED APPLICATIONS

This application claims the benefit of Korean Patent Application No. 2002-31959, filed Jun. 7, 2002, in the Korean Intellectual Property Office, the disclosure of which is incorporated herein by reference.

BACKGROUND OF THE INVENTION

1. Field of the Invention

The present invention relates to a monitor, and more particularly, to a monitor which is improved in a mechanism tilting a monitor main body against a base member and simplified in design.

2. Description of the Related Art

Figure 1:
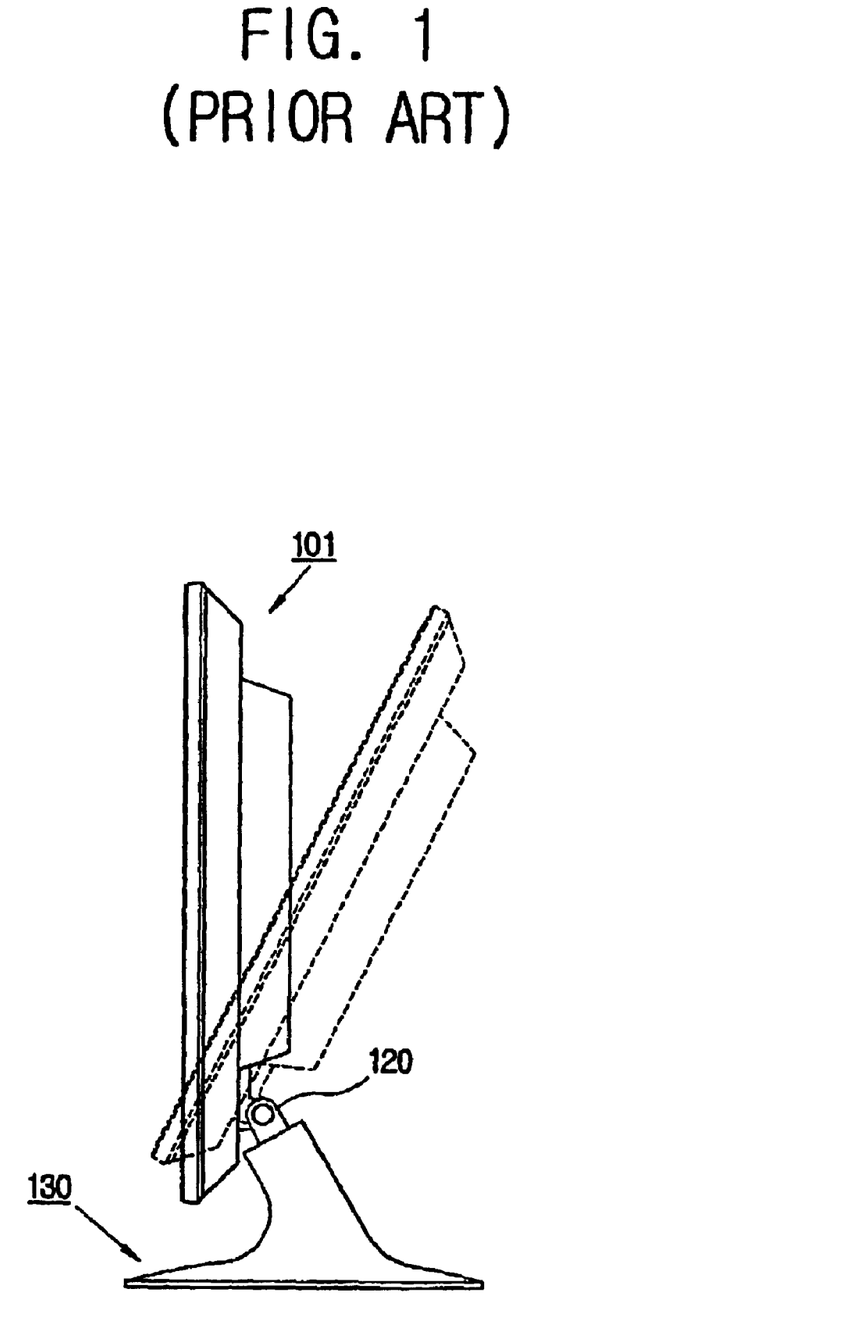
FIG. 1 is a side view of a conventional monitor.

As shown in FIG. 1, a conventional monitor includes a base member 130 set on an installation plane, a monitor main body 101 displaying a picture, and a link member 120 linking the base member 130 to the monitor main body 101.

A lower part of the link member 120 is incorporated with the base member 130, and an upper part of the link member 120 is rotatably combined with the monitor main body 101. Thus, the monitor main body 101 can be tilted upwardly and downwardly against the link member 120 or the base member 130.

Further, in the conventional monitor, a tilt of the monitor main body 101 against the link member 120 is limited to a tilting angle between 0° and 30°. That is, a user can tilt the monitor main body 101 against the link member 120 only within the tilting angle 0°~30°. Herein, even if the monitor main body 101 is tilted up and down against the link member 120 within the tilting angle between 0° and 30°, a gap between the base member 130 and the monitor main body 101 may be not exposed in a user's view.

Recently, a user wants to tilt the monitor main body 101 more widely than the tilting angle between 0° and 30°. However, if the monitor main body is tilted beyond the tilting angle between 0° and 30° in the conventional monitor, the gap between the base member and the monitor main body can be exposed in a user's view. That is, a structure, such as the link member disposed in a rear side of the monitor, can be exposed through the gap between the base member and the monitor main body.

SUMMARY OF THE INVENTION

Accordingly, it is an aspect of the present invention to provide a monitor in which a tilting angle of a monitor main body can be widened while a gap between a base member and a monitor main body is shielded.

Additional aspects and advantages of the invention will be set forth in part in the description which follows and, in part, will be obvious from the description, or may be learned by practice of the invention.

The foregoing and/or other aspects of the present invention are achieved by providing a monitor including a monitor main body, a base member supporting the monitor main body, a monitor hinge supporting the monitor main body to be tilted against the base member within a predetermined angle, and a shield rotatably combined with the monitor main body to shield a gap between the monitor main body and the base member by rotating downwardly when the monitor main body is tilted.

According to an aspect of the present invention, the shield includes a shield main body combined with the monitor main body and a rotatable body rotatably combined to the shield main body and shielding the gap between the monitor main body and the base member.

According to another aspect of the present invention, the shield main body includes a main part having a plate shape and combined to a rear side of the monitor main body, and a pair of main part supporting parts provided in opposite ends of the main part perpendicular to a surface of the main part. The rotatable body includes a pair of rotatable body supporting parts rotatably coupled to the main part supporting parts, respectively, and a shielding part provided between the rotatable body supporting parts to shield the gap between the monitor main body and the base member.

According to another aspect of the present invention, one of the main part supporting part and the rotatable body supporting part is formed with a hinge hole, and the other one of the main part supporting part and the rotatable body supporting part is formed with a hinge projection in correspondence to the hinge hole.

According to another aspect of the present invention, the shield includes a spring member elastically separating a rotatable body from the shield main body.

According to another aspect of the present invention, the spring member includes a flat spring having a first end combined with the main part of the shield main body.

According to another aspect of the present invention, the monitor includes a link member provided between the monitor main body and the base member and rotatably combined with the monitor main body.

According to another aspect of the present invention, the link member accommodates cables connected to the monitor main body therein and passes through the gap between the monitor main body and the base member.

According to another aspect of the present invention, the monitor includes a pair of monitor brackets spaced-apart from each other and fastened to the monitor main body, and a pair of monitor hinges rotatably connecting opposite upper end parts of the link member to the monitor brackets, respectively.

According to another aspect of the present invention, at least one of the monitor hinges is provided with a tilt limiting unit limiting a tilt of the monitor main body against the link member.

According to another aspect of the present invention, the tilt limiting unit includes a rotation limiting washer, a pair of guide projections formed in the rotation limiting washer to be spaced from each other, and a rotation limiting projection incorporated with at least one of the monitor brackets and disposed between the guide projections to rotate within a predetermined angle.

BRIEF DESCRIPTION OF THE DRAWINGS

These and/or other aspects and advantages of the present invention will become apparent and more readily appreciated from the following description of the embodiments, taken in conjunction with the accompany drawings of which.

DETAILED DESCRIPTION OF THE PREFERRED EMBODIMENTS

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Hereinafter, the embodiments of the present invention will be described below with reference to the accompanying drawings.

Figure 2:
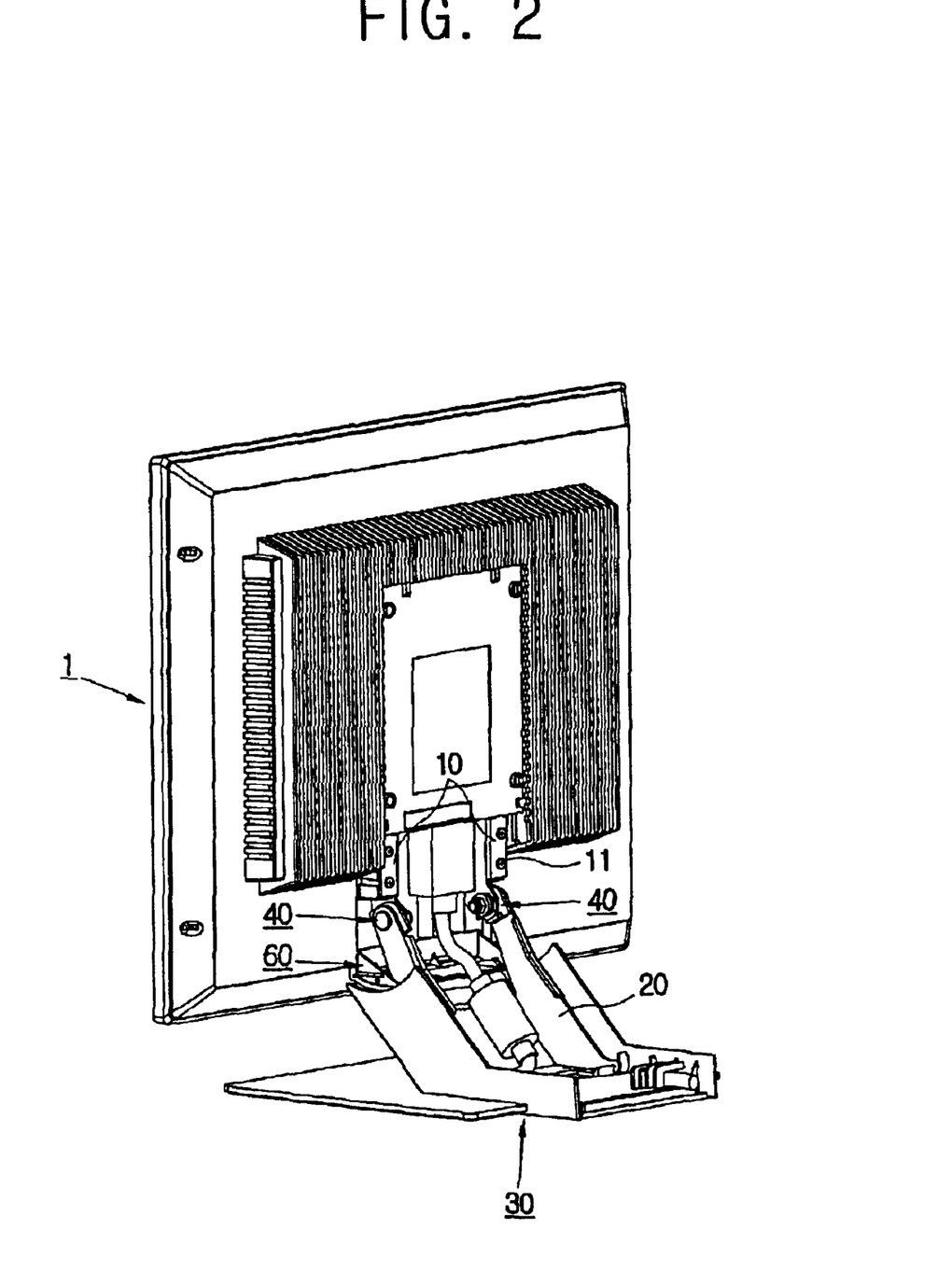
FIG. 2 is a rear perspective view of a monitor according to a first embodiment of the present invention.
Figure 3:
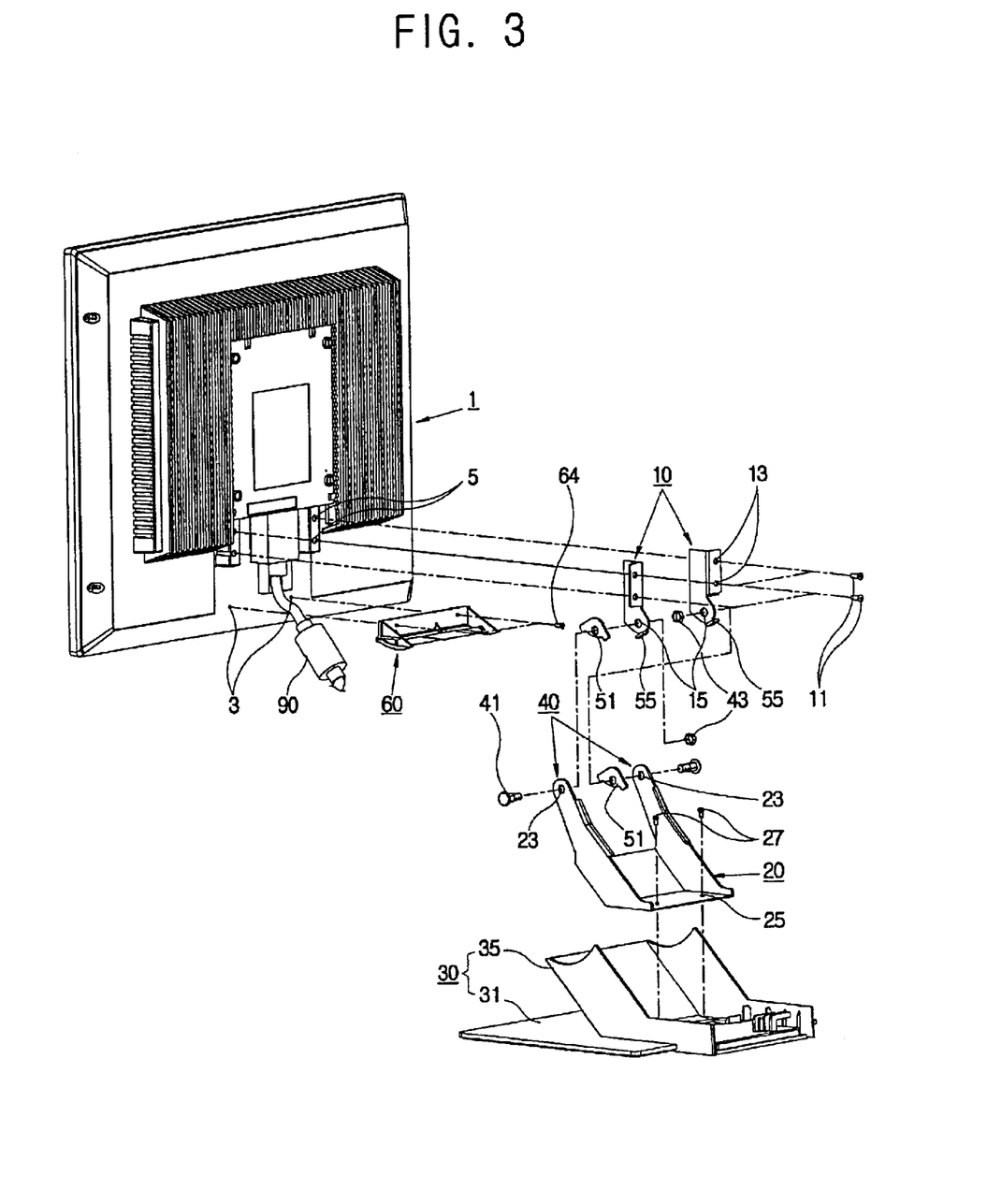
FIG. 3 is an exploded perspective view of the monitor of FIG. 2.
Figure 4:
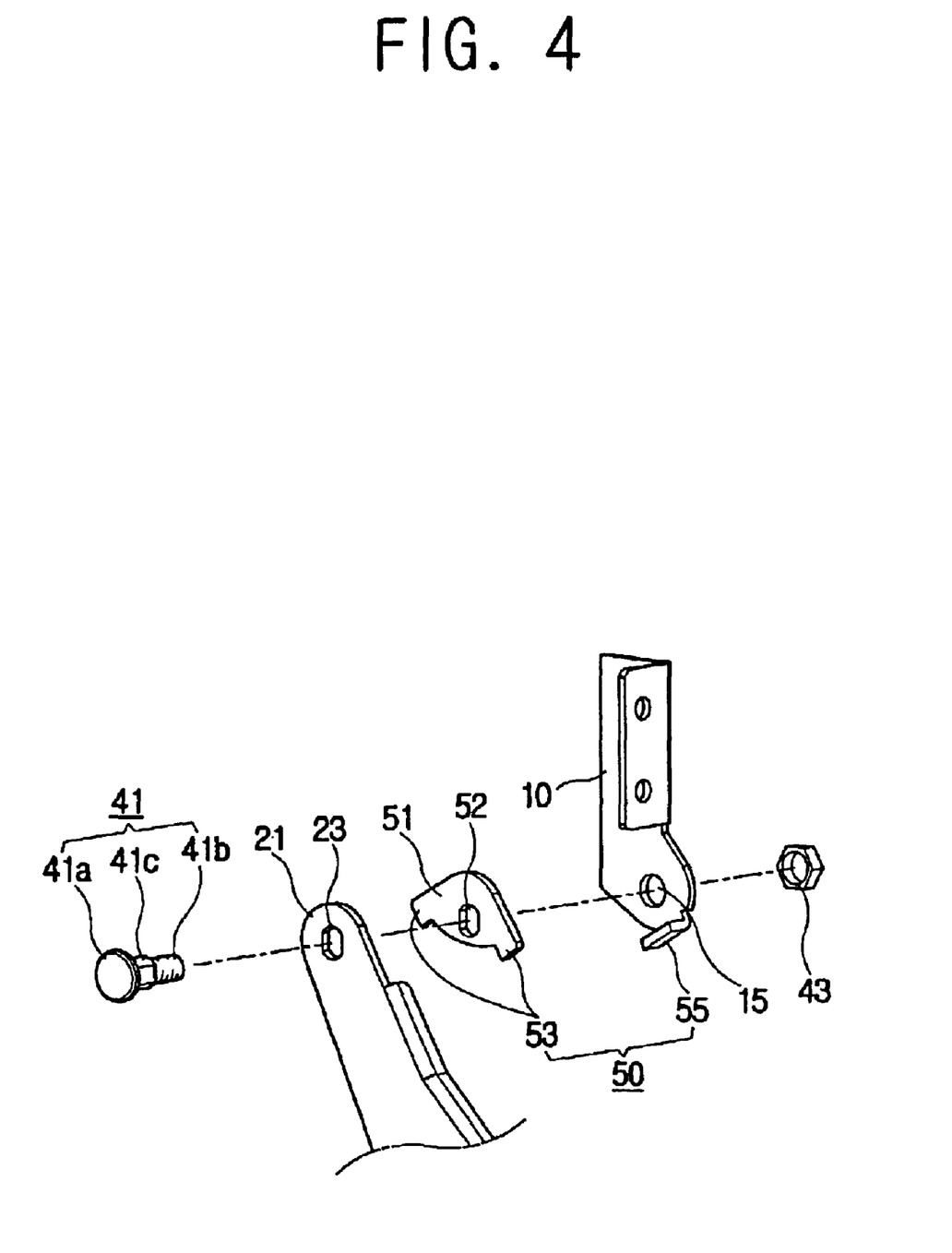
FIG. 4 is an enlarged exploded perspective view of a monitor hinge of the monitor of FIG. 2.

As shown in FIGS. 2 through 4, a monitor according to an embodiment of the present invention includes a monitor main body 1, a base member 30 supporting the monitor main body 1 and being set on an installation surface such as a table, etc., a link member 20 linking the base member 30 with the monitor main body 1, and a monitor hinge 40 rotatably coupling the monitor main body 1 to the link member 120, so that the monitor main body is tilted against the base member 30 within a predetermined tilting angle. Further, the monitor includes a shield 60 rotatably connected to the monitor main body 1 to shield a gap between the base member 30 and the monitor main body 1 which may be exposed in a user's view when the monitor main body 1 is tilted against the base member 30.

Provided in a rear side of the monitor main body 1 is a pair of monitor brackets 10 spaced from each other and rotatably connecting the monitor main body 1 to the link member 20.

Each monitor bracket 10 is formed with bracket bolt through holes 13 through which bracket bolts 11 are fastened to screw holes 5 formed in the rear side of the monitor main body 1, and the monitor bracket 10 is also formed with a first hinge hole 15 to which a hinge bolt 41 of the monitor hinge 40 (to be described in detail later) is rotatably combined.

The base member 30 includes a lower plate 31 set on the installation surface and an upper bracket 35 mounted on an upper surface of the lower plate 31 and accommodating the link member 20. The lower plate 31 is incorporated with the upper bracket 35 and combined with a lower end part 25 of the link member 20 at a rear portion thereof where the upper bracket 35 is placed, thereby supporting the monitor main body 1.

The link member 20 has a "U" shaped cross section, is accommodated in the upper bracket 35 of the base member 30, and includes the lower end part 25 bent from a lower part thereof and fixedly connected to the lower plate 31 of the base member 30 with lower part bolts 27. A pair of upper end parts 21 provided in an upper part of the link member 20 is rotatably connected to the monitor main body 1. The upper end parts 21 are extended from upper opposite sides of the lower end part 25 of the link member 20, and each upper end part 21 has a noncircular-shaped second hinge hole 23 into which the hinge bolt 41 of the monitor hinge 40 is inserted. Herein, the link member 20 accommodates cables 90 connected between the monitor main body 1 and a computer main body (not shown).

The monitor hinge 40 forms a pair symmetrically disposed and spaced from each other and includes two hinge bolts 41 and two hinge nuts 43 to rotatably connect the pair upper end parts 21 of the link member 20 to the monitor brackets 10, respectively.

The hinge bolt 41 has a head 41a, a threaded rod 41b smaller in diameter than the head 41a in cross section and combined with the hinge nut 43, and a noncircular-shaped spline part 41c provided between the head 41a and the threaded rod 41b. The spline part 41c is engaged with the noncircular-shaped second hinge hole 23 formed on the upper end part 21 of the link member 20 and to a noncircular-shaped washer hole 52 formed on a rotation limiting washer 51 (to be described in detail later).

On the other hand, the monitor hinge 40 includes a tilt limit unit 50 limiting a tilt of the monitor main body 1 against the link member 20.

The tilt limiting unit 50 includes a rotation limiting washer 51 formed with a pair of guide projections 53 protruding in a radial direction to be spaced from each other, and a pair of rotation limiting projections 55 incorporated with corresponding monitor bracket 10 and rotating between the guide projections 53 forming a predetermined angle. On a center of the rotation limiting washer 51 is formed the washer hole 52 having a noncircular shape and engaged with the spline part 41c of the hinge bolt 41. The rotation limiting projections 55 may be perpendicularly bent from a position disposed adjacent to the first hinge hole 15 of the monitor bracket 10 toward the rotation limiting washer 51.

Thus, the rotation limiting washer 51 is combined with the hinge bolt 41 and the second hinge hole 23 formed on the upper end part 21 of the link member 20, so that the rotation limiting washer 51 is prevented from rotating with respect to the link member 20. To the contrary, the first hinge hole 15 of the monitor bracket 10 is rotatably engaged with the hinge bolt 41, so that the monitor bracket 10 can be rotated with respect to the link member 20 and the rotation limiting washer 51. Herein, the rotation limiting projections 55 of each monitor bracket 10 can be rotated between the guide projections 53 of each rotation restricting washer 51, so that the tilt of the monitor main body 1 combined with the monitor bracket 10 is limited within the angle formed between the guide projections 53. Therefore, just altering a design of the angle between the guide projections 53 of the rotation limiting washer 51 will easily change a tilting angle of the monitor main body 1.

With this configuration, a process of assembling the monitor hinge 40 and an operation of the monitor hinge 40 will be described below.

First, the lower end part 25 of the link member 20 is mounted onto the upper surface of the lower plate 31 of the base member 30, and the monitor brackets 10 are coupled to the rear side of the monitor main body 1 to be spaced from each other.

Thereafter, the hinge bolts 41 are inserted into the respective second hinge holes 23 formed on the upper end parts 21 of the link member 20, the spline part 41c of each hinge bolt 41 is engaged with the noncircular-shaped each second hinge hole 23 and end portions of the spline parts 41C of the hinge bolts 41 face each other. Further, the rotation limiting washers 51 are combined to the hinge bolts 41, respectively, so that the washer hole 52 is engaged with the spline part 41c. Thus, each hinge bolt 41 is combined with the rotation limiting washer 51 and the upper end part 21 of the link member 20.

To the contrary, each circular-shaped first hinge hole 15 of the monitor brackets 10 combined to the monitor main body 1 is rotatably engaged with the hinge bolt 41, and the rotation limiting projection 55 is disposed between the guide projections 53 of the rotation restricting washer 51. Thus, the pair of the projections 53 limit a rotation of the rotation restricting projection 55 (see FIGS. 6 and 7).

Thereafter, the hinge nuts 43 are coupled to the threaded rods 41*b* of the hinge bolts 41, respectively, thereby coupling the upper end parts 21, the rotation restricting washers 51, and the monitor brackets 10 together. Herein, a binding force of the hinge nuts 43 relative to the hinge bolts 41 should be greater than a torque generated due to a weight of the monitor main body 1. Thus, a user can tilt up the monitor main body 1 against the base member 30. Herein, the tilting angle of the monitor main body 1 according to the present invention may be within 0°~40°, and besides, the monitor main body 1 can be designed to have various tilting angle ranges as the demands.

On the other hand, as the tilting angle of the monitor main body 1 is widened, the monitor according to the embodiment of the present invention includes the shield 60 (see FIG. 5) shielding the gap between the upper bracket 35 of the base member 30 and a front lower part of the monitor main body 1 when the monitor main body 1 is tilted up against the base member 30.

Figure 5:
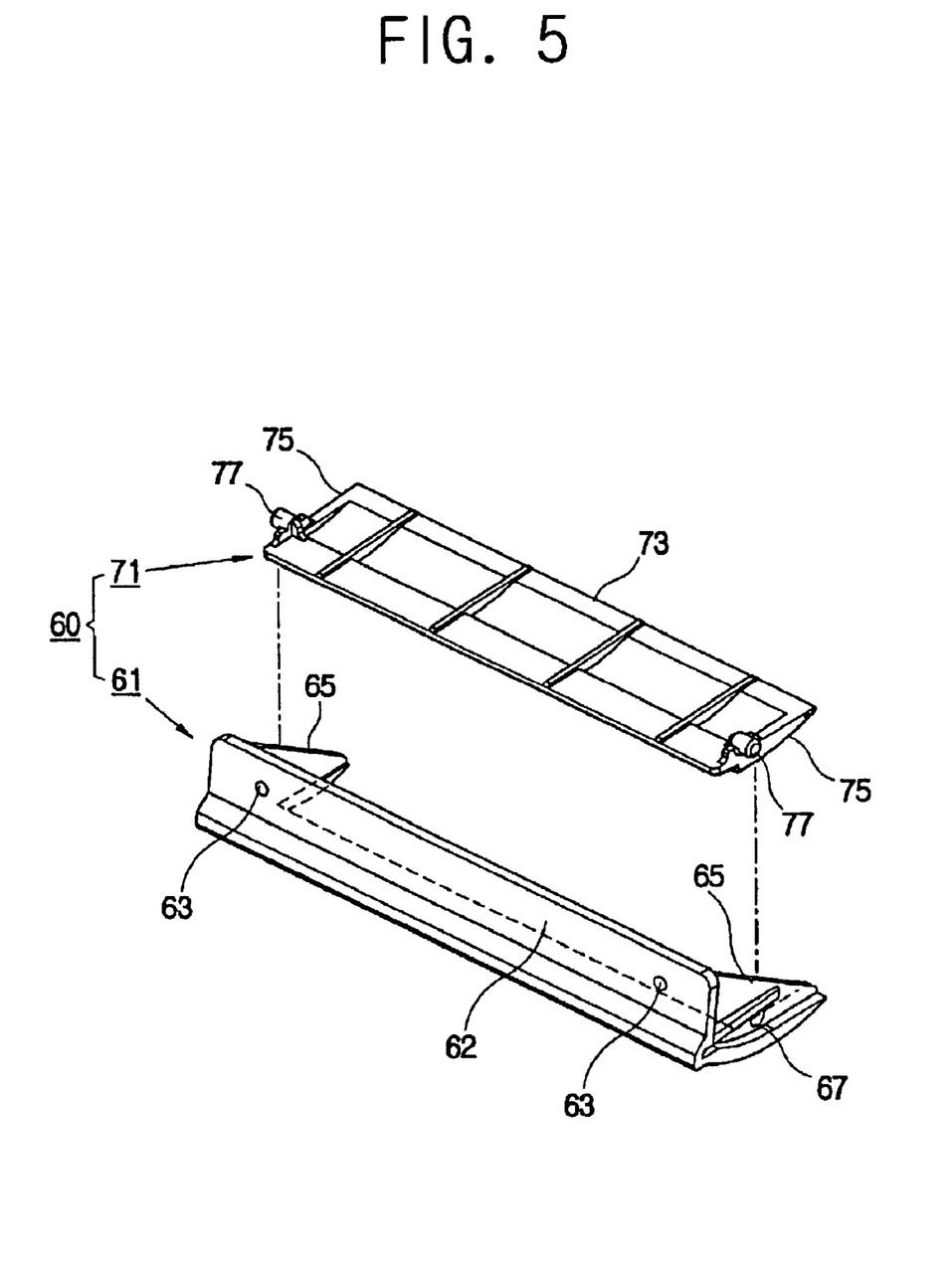
FIG. 5 is an exploded perspective view of a shield of FIG. 3.

As shown in FIG. 5, the shield 60 includes a shield main body 61 connected to the monitor main body 1, and a rotatable body 71 rotatably combined to the shield main body 61 and shielding the gap between the monitor main body 1 and the base member 30.

The shield main body 61 includes a main part 62 having a plate shape and combined to the rear of the monitor main body 1, and a pair of main part supporting parts 65 provided in opposite ends of the main parts 62 to be perpendicular to a surface of the main part 62. The main part 62 is formed with shield bolt through holes 63 through which shield bolts 64 are inserted into the shield combining holes 3 formed on the rear of the monitor main body 1 (see FIG. 3).

The rotatable body 71 includes a pair of rotatable body supporting parts 75 rotataby coupled to the main part supporting parts 65, respectively, and a shielding part 73 provided between the rotatable body supporting parts 75 to shield the gap between the monitor main body 1 and the base member 30.

In a surface of each main part supporting part 65 is formed a hinge hole 67, and in a surface of each rotatable body supporting part 75 is formed a hinge projection 77 rotatably inserted in the hinge hole 67 of the main part supporting part 65.

With this configuration, the process of assembling the shield 60 will be described below.

First, the hinge projections 77 protruded on the rotatable body supporting parts 75 of the rotatable body 71 are rotatably inserted in the hinge holes 67 of the main part supporting parts 65, thereby rotatably connecting the shielding part 73 to the shield main body 61. Thereafter, the shield bolts 64 are inserted into corresponding ones of the shield bolt through holes 63 formed on the main part 62 of corresponding ones of shield main body 61 and are fastened to the shield combining holes 3 formed on the monitor main body 1, thereby combining the shield 60 with the monitor main body 1.

Figure 6:
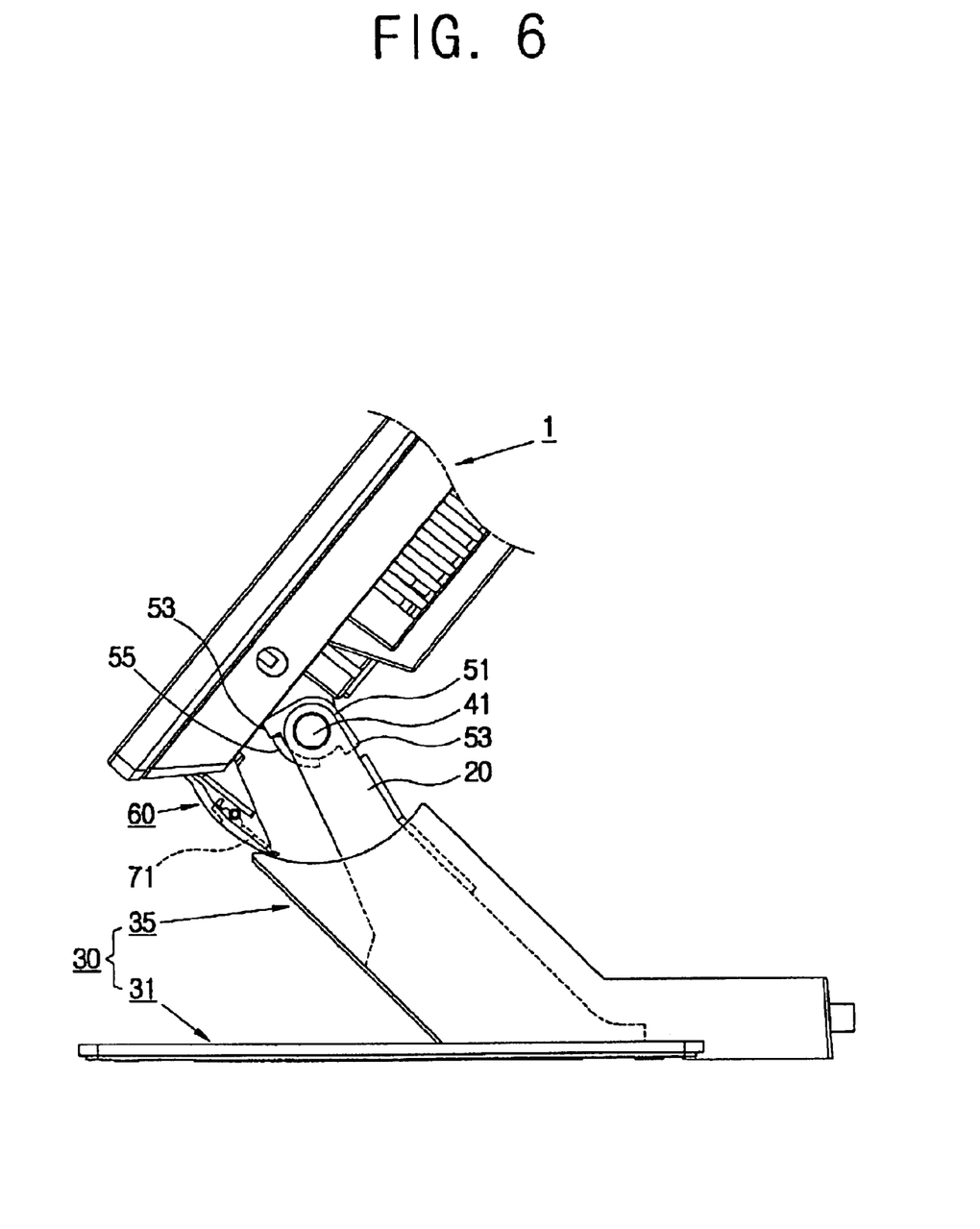
FIG. 6 is a sectional view showing a state that a monitor main body is upwardly tilted in the monitor of FIG. 2.
Figure 7:
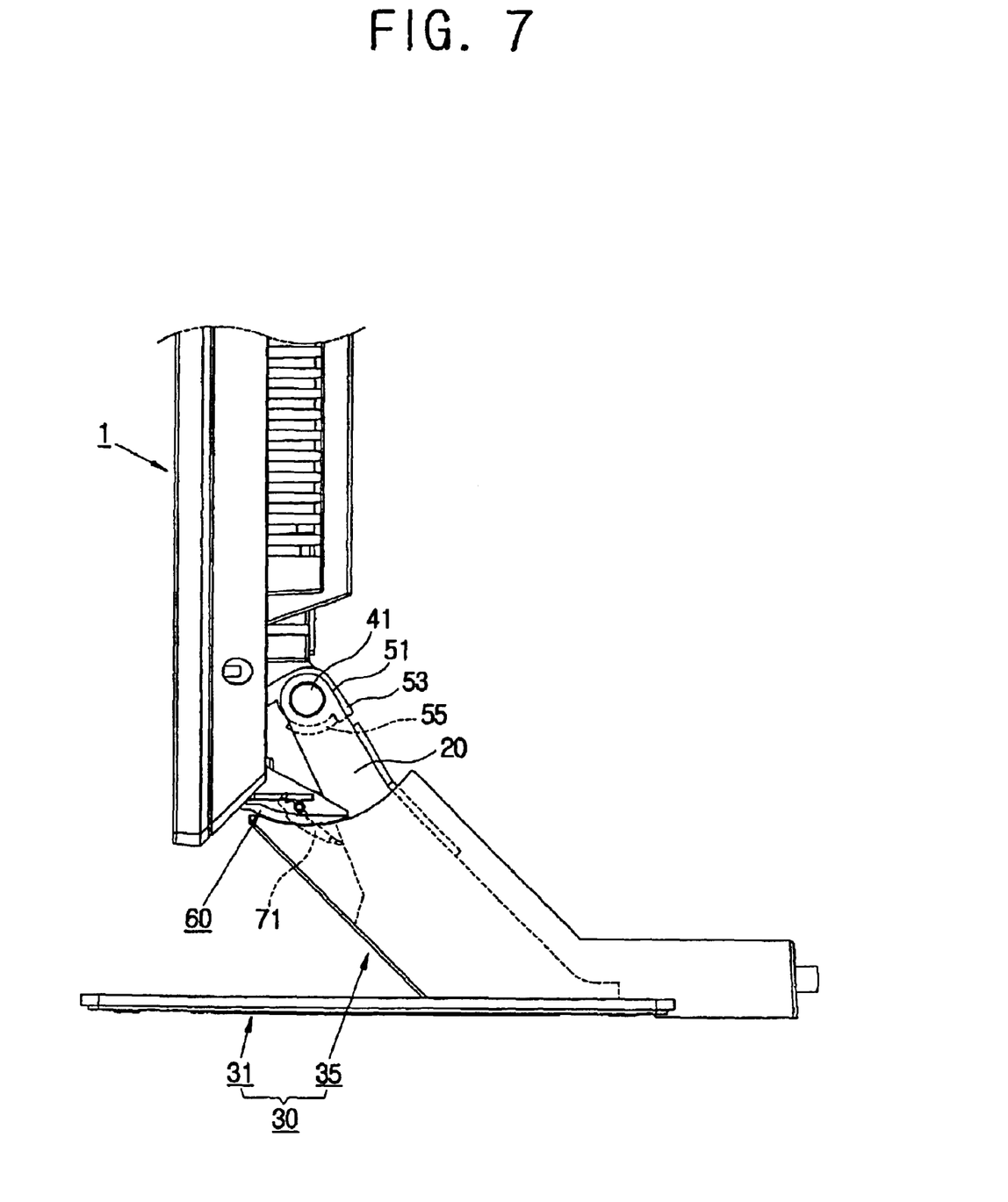
FIG. 7 is a sectional view showing another state that the monitor main body is downwardly tilted in the monitor of FIG. 2.

As shown in FIGS. 6 and 7, the operation of the shield 60 of the monitor according to the embodiment of the present invention is as follows.

When the monitor main body 1 is tilted up against the base member 30, the rotatable body 71 is downwardly rotated with respect to the shield main body 61 by its own weight, thereby shielding the gap between the monitor main body 1 and the base member 30. When the monitor main body 1 is tilted down against the base member 30, the rotatable body 71 is forwardly rotated with respect to the shield main body 61 to be pushed by a back structure, such as the link member 20 disposed in rear portions of the monitor main body 1 and the base member 30, the cables 90, etc.

Figure 8:
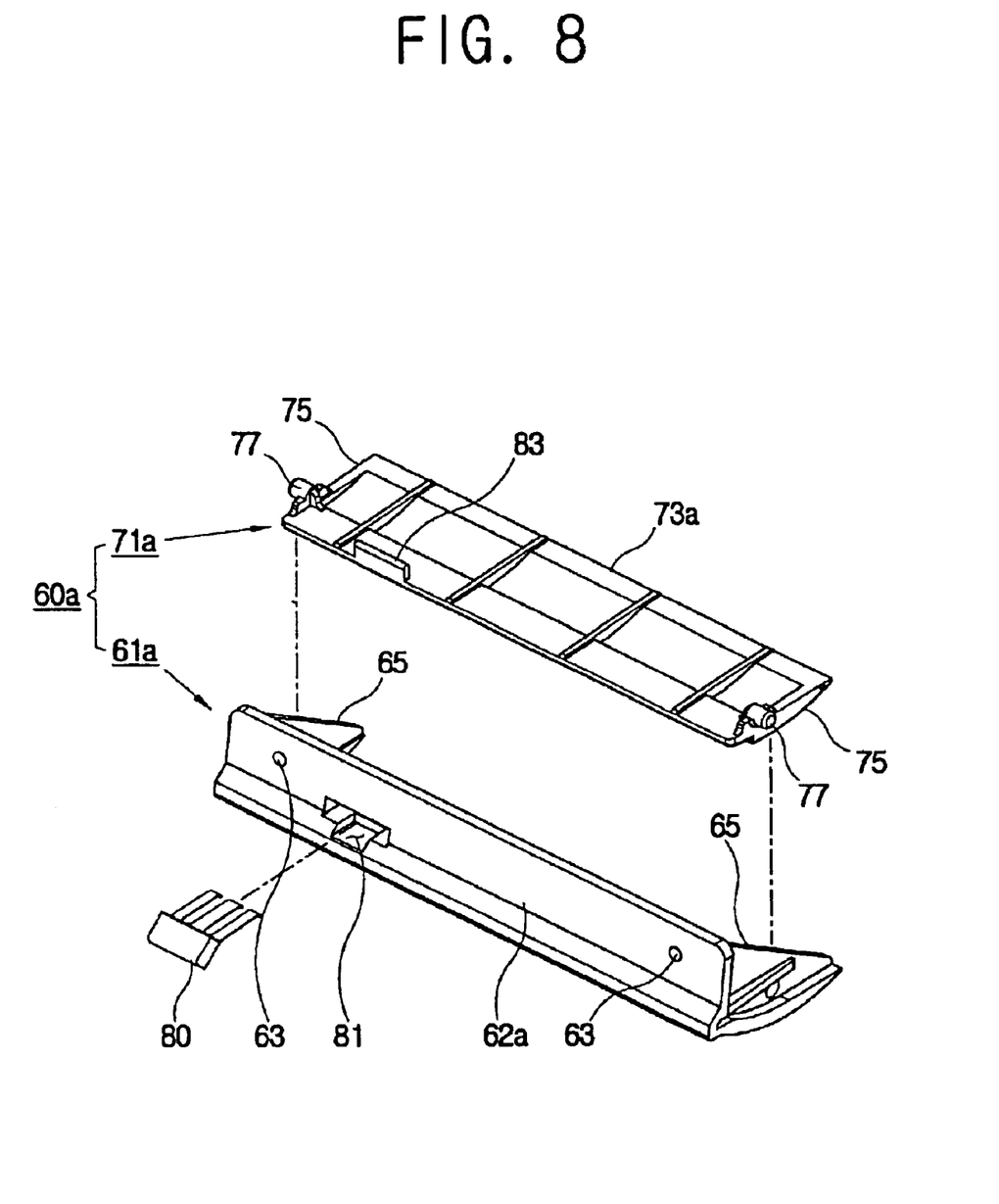
FIG. 8 is an exploded perspective view of a shield of a monitor according to another embodiment of the present invention.

FIG. 8 is an exploded perspective view of another shield of the monitor according to another embodiment of the present invention. In the second embodiment, elements like those of the first embodiment will be given like reference numerals, and repetitive descriptions will be avoided as necessary.

Contrary to the shield 60 of FIG. 5, a shield 60*a* shown in FIG. 8 is provided with a flat spring 80 elastically separating a rotatable body 71*a* from a shield main body 61*a*. The flat spring 80 has a first end coupled to a spring holder 81 formed on a main part 62*a* of the shield main body 61*a*, and a second end being in contact with a shielding part 73*a* of the rotatable body 71*a*, thereby elastically separating the shielding part 73*a* from the shield main body 61*a*. Thus, the rotatable body 71*a* is elastically kept apart from the shield main body 61*a* by the flat spring 80.

With this configuration, an operation of the shield 60*a* of the monitor according to this second embodiment of the present invention is as follows.

When the monitor main body 1 is tilted up against the base member 30, the rotatable body 71*a* is downwardly rotated with respect to the shield main body 61*a* by its own weight and an elasticity (elastic force) of the flat spring 80, thereby shielding the gap between the monitor main body 1 and the base member 30. When the monitor main body 1 is tilted down against the base member 30, the rotatable body 71*a* is forwardly rotated with respect to the shield main body 61*a* to be pushed by the back structure, such as the link member 20 disposed in the rear portion of the base member 30, the cables 90, etc., by overcoming the elasticity of the flat spring 80. Thus, the flat spring 80 is provided between the shield main body 61*a* and the rotatable body 71*a*, thereby facilitating a downward rotation of the rotatable body 71*a*.

In the shield 60*a*, the shield main body 61*a* can be combined with the rear side of the monitor main body 1 like the first embodiment or the base member 30 so as to shield the gap between the monitor main body 1 and the base member 30.

In a case that the shield main body 61*a* is combined with the base member 30, the operation of the shield 60*a* of the monitor is as follows.

When the monitor main body 1 is tilted up against the base member 30, the rotatable body 71*a* is upwardly rotated with respect to the shield main body 61*a* by the elasticity of the flat spring 80, thereby shielding a gap between the monitor main body 1 and the base member 30. When the monitor main body 1 is tilted down against the base member 30, the rotatable body 71*a* is backwardly rotated against the shield main body 61*a* to be pushed by the monitor main body 1 to overcome the elasticity of the flat spring 80.

In this embodiment, between the shield main body 61*a* and the rotatable body 71*a* is provided the flat spring 80. However, between the shield main body 61*a* and the rotatable body 71*a* may be provided with various spring members, such as a torsion spring elastically separating the rotatable body 71*a* from the shield main body 61*a*.

As described above, the monitor according to the present invention includes the monitor hinge rotatably combining the monitor main body to a link member so as to tilt the monitor main body against the base member, and the shield shielding the gap between the front lower part of the monitor main body and the upper bracket of the base member when the monitor main body is tilted up against the base member, so that the tilting angle range of the monitor main body can be easily widened, and so that the gap formed between the base member and the monitor main body and exposed in the user's view when the monitor main body is tilted is shielded.

As described above, the present invention provides the monitor in which the tilting angle range of the monitor main body with respect to the base member can be easily widened.

Further, the present invention provides the monitor which can shield the gap shown between the base member and the monitor main body due to the tilt of the monitor main body.

Although a few embodiments of the present invention have been shown and described, it will be appreciated by those skilled in the art that changes may be made in these embodiments without departing from the principles and spirit of the invention, the scope of which is defined in the appended claims and their equivalents.

What is claimed is:

1. A tilting apparatus in a monitor comprising:
   a monitor main body;
   a base member;
   a monitor hinge supporting the monitor main body to be tilted against the base member within a predetermined angle; and
   a shield rotatably connected to the monitor main body to shield a gap formed between the monitor main body and the base member when the monitor main body is tilted up with respect to the base member,
   wherein the shield comprises:
   a shield main body connected to the monitor main body; and
   a rotatable body rotatably connected to the shield main body to shield the gap between the monitor main body and the base member.

2. The monitor according to claim 1, wherein the shield main body comprises a main part having a plate shape and combined to a rear side of the monitor main body and a pair of main part supporting parts provided in opposite ends of the main part and being perpendicular to a surface of the main part, and the rotatable body comprises:
   a pair of rotatable body supporting parts rotataby coupled to the main part supporting parts, respectively; and
   a shielding part provided between the rotatable body supporting parts to shield the gap between the monitor main body and the base member.

3. The monitor according to claim 2, wherein the shield includes a spring member elastically separating the rotatable body from the shield main body.

4. The monitor according to claim, wherein the spring member comprises a flat spring having a first end combined to the main part and a second end contacting the shielding part.

5. The monitor according to claim 2, wherein one of the main part supporting part and the rotatable body supporting part comprises a hinge hole, and the other one of the main part supporting part and the rotatable body supporting part comprises a hinge projection in correspondence to the hinge hole.

6. The monitor according to claim 5, wherein the shield includes a spring member elastically separating a rotatable body from the shield main body.

7. The monitor according to claim 6, wherein the spring member comprises a flat spring having a first end combined to the main part and a second end contacting the shielding part.

8. The monitor according to claim 1, wherein the monitor hinge comprises:
   a link member provided between the monitor main body and the base member and rotatably combined with the monitor main body.

9. The monitor according to clam 8, herein the monitor comprises a cable coupled to the monitor main body and disposed in the gap, and the link member accommodates the cable therein.

10. The monitor according to claim 8, wherein the monitor hinge comprises:
    a pair of monitor brackets spaced from each other, fastened to the monitor main body, and rotatably connected to the link member.

11. The monitor according to claim 10, wherein the monitor hinge comprises:
    a tilt limiting unit limiting a monitor main body against the link member.

12. The monitor according to claim 11, wherein the tilt limiting unit comprises:
    a rotation limiting washer formed with a pair of guide projections protruding and spaced from each other; and
    a rotation limiting projection incorporated with one of the monitor brackets, disposed between the guide projections, and rotating within a predetermined angle formed by the guide projections.

13. A monitor, comprising
    a monitor main body;
    a base member;
    a monitor hinge mounted on the base member and rotatably connected to the monitor main body to form an angle with the monitor main body; and
    a shield movably connected to one of the base member, the monitor hinge, and the monitor main body to shield a gap formed between the monitor main body and the base member in response to a tilting movement of the monitor main body, wherein the shield comprises:
    a shield main body having a main part mounted on the one of the base member, the monitor hinge, and the monitor main body, a main part supporting part extended from the main part, a hinge projection formed on the main part supporting part; and
    a rotatable body having a shield part and a hinge hole formed on the shield part to receive the hinge projection of the main part supporting part, the shield part rotating to shield the gap in response to the tilting movement of the monitor main body.

14. The monitor according to claim 13, wherein the rotatable body rotates about an axis passing through one of the hinge hole and the hinge projection.

15. The monitor according to claim 13, wherein the shield comprises:
    a spring holder formed on the main part of the shield main body; and
    a flat spring disposed in the holder and extended toward the shield part of the rotatable body to bias the rotatable body with respect to the shield main body to shield the gap in response to the tilting movement of the monitor main body.

16. The monitor according to claim 13, wherein the shield comprises: a flat spring disposed between the shield and the monitor main body or between the shield and the base member to bias the shield to move to shield the gap in response to the tilting movement of the monitor main body.

17. The monitor according to claim 13, wherein the monitor main body forms a first angle and a second angle greater than the first angle with the base member to form the gap, and the shield moves from a first position to a second position to shield the gap in response to the tilting movement when the monitor main body is tilted to form the second angle with the base member.

18. The monitor according to claim 13, wherein the monitor hinge comprises:
  a link member;
  a lower end part formed on the link member and coupled to the base member; and
  a monitor bracket fixedly connected to the monitor main body and rotatably connected to the link member.

19. The monitor according to claim 18, wherein the monitor bracket comprises a hinge hole, and the monitor hinge comprises:
  an upper end part formed on the link member;
  a non-circular shaped hinge hole formed on the upper end part of the link member; and
  a hinge bolt having a non-circular shaped spline part and a rod to be connected to the non-circular shaped hinge hole of the upper end part of the link member and the hinge hole of the monitor bracket, respectively.

20. The monitor according to claim 19, wherein the monitor hinge comprises a hinge bolt, and the hinge bolt comprises a threaded portion formed on the rod to be coupled to the hinge nut when the non-circular shaped spline part of the hinge bolt is disposed in the non-circular shaped hinge hole and when the rod is disposed in the hinge hole of the monitor bracket.

21. The monitor according to claim 19, wherein the monitor hinge comprises a rotating limiting washer having a non-circular shaped washer hole and guide projections spaced-apart from each other and disposed around the non-circular shaped washer hole, end the monitor bracket comprises:
  a rotation limiting projection disposed to rotate between the guide projections of the rotating limiting washer to limit the angle between the base member and the monitor main body.

22. The monitor according to claim 21, wherein the rotating limiting washer is disposed between the upper end part and the monitor bracket, and the non-circular shaped spline part of the hinge bolt is inserted into the non-circular shaped hinge hole of the upper end part and the rotation limiting washer while the rod of the hinge bolt is inserted Into the hinge hole of the monitor bracket.

23. The monitor according to claim 21, wherein the monitor bracket rotates with respect to the upper end part of the monitor hinge and the rotation limiting washer.

24. The monitor according to claim 21, wherein the rotation limiting washer does not rotate with respect to the upper end part of the monitor hinge.

25. The monitor according to claim 13, wherein the angle formed by the monitor main body and the base member is in a range between 0° and 40° inclusive.

* * * * *

UNITED STATES PATENT AND TRADEMARK OFFICE
CERTIFICATE OF CORRECTION

PATENT NO. : 6,912,120 B2
DATED : June 28, 2005
INVENTOR(S) : Ki-hyub Sung et al.

It is certified that error appears in the above-identified patent and that said Letters Patent is hereby corrected as shown below:

<u>Column 7,</u>
Line 50, delete "rotataby" and insert -- rotatably --.
Line 58, delete "claim" and insert -- claim 3 --.

<u>Column 8,</u>
Line 13, delete "clam 8, herein" and insert -- claim 8, wherein --.

<u>Column 10,</u>
Line 9, after "hole" delete "end" end insert -- and --.
Line 22, delete "Into" and insert -- into --.

Signed and Sealed this

Twenty-first Day of March, 2006

JON W. DUDAS
*Director of the United States Patent and Trademark Office*